United States Patent [19]
Yamazaki et al.

[11] Patent Number: 5,961,883
[45] Date of Patent: Oct. 5, 1999

[54] OXIDE FLUORESCENT GLASS CAPABLE OF EXHIBITING VISIBLE FLUORESCENCE

[75] Inventors: Masaaki Yamazaki; Masaaki Otsuka; Hideaki Takaku; Naruhito Sawanobori, all of Urawa, Japan

[73] Assignee: Sumita Optical Glass, Inc., Japan

[21] Appl. No.: 08/989,170

[22] Filed: Dec. 11, 1997

[30] Foreign Application Priority Data

Dec. 12, 1996 [JP] Japan ................................. 8-332172

[51] Int. Cl.$^6$ ............................. C03C 3/04; C09K 11/77
[52] U.S. Cl. ........................ 252/301.4 F; 252/301.6 F; 501/64; 501/73; 501/65; 501/72; 501/152
[58] Field of Search ................... 252/301.6 F, 301.4 F; 501/64, 73, 65, 72, 152

[56] References Cited

U.S. PATENT DOCUMENTS

| | | | |
|---|---|---|---|
| 4,102,805 | 7/1978 | Mizzoni et al. | 252/301.4 F |
| 4,751,148 | 6/1988 | Popma et al. | 252/301.6 F |
| 4,814,105 | 3/1989 | Oversluizen et al. | 501/64 |
| 5,039,631 | 8/1991 | Krashkevich et al. | 501/64 |
| 5,108,959 | 4/1992 | Buchanan et al. | 501/50 |

FOREIGN PATENT DOCUMENTS

| | | |
|---|---|---|
| 0 266 812 | 5/1988 | European Pat. Off. |
| 0 338 934 | 10/1989 | European Pat. Off. |
| 338934 | 10/1989 | European Pat. Off. |
| 0 709 345 | 5/1996 | European Pat. Off. |
| 50-52362 | 5/1975 | Japan ............................. 252/301.4 F |
| 1136239 | 12/1968 | United Kingdom . |

OTHER PUBLICATIONS

*Database WPI*, Section Ch, Week 7535, Abstract No. 75–57668W (abstract of JP 49–116111) (Nov. 6, 1974).
*Database WPI*, Section Ch, Week 8305, Abstract No. 84–10494K (abstract of JP 57–205339) (Dec. 16, 1982).
*Database WPI*, Section Ch, Week 7514, Abstract No. 75–23009W (abstract of JP 49–099609) (Sep. 20, 1974).
Database WPI, Section Ch, Week 7515, Abstract No. 75–24919W (abstract of JP 49–099610) (Sep. 20, 1974).
Derwent Abstract No. 75–24919W, which is abstract ofr JP49–99610, Sep. 20, 1974.

*Primary Examiner*—C. Melissa Koslow
*Attorney, Agent, or Firm*—Wenderoth, Lind & Ponack, L.L.P.

[57] ABSTRACT

A glass material is provided which is capable of exhibiting fluorescence in the visible region by ultraviolet ray excitation. This glass material is represented, in term of atoms for making up the glass, by the following chemical composition (mol %):

| | |
|---|---|
| $SiO_2$ | 2 to 60%, |
| $B_2O_3$ | 5 to 70% ($SiO_2 + B_2O_3$ = 50 to 70%) |
| RO | 5 to 30% (R: at least one atom selected from Mg, Ca, Sr and Ba) |
| ZnO | 0 to 15% |
| $ZrO_2$ | 0 to 10%, |
| $Tb_2O_3$ or $Eu_2O_3$ | 2 to 15% (containing either of $Tb_2O_3$ or $Eu_2O_3$) |
| $Ln_2O_3$ | 0 to 20% (Ln: at least one atom selected from Y, La, Gd, Yb, Lu, Sm, Dy and Tm) |
| $CeO_2$ | 0 to 1% |
| $Bi_2O_3$ | 0 to 2% |
| $Sb_2O_3$ | 0.01 to 0.5% and |
| $R'_2O$ | 0 to 20% (R': at least one atom selected from Li, Na and K) |

1 Claim, 1 Drawing Sheet

5,961,883

OXIDE FLUORESCENT GLASS CAPABLE OF EXHIBITING VISIBLE FLUORESCENCE

BACKGROUND OF THE INVENTION

1. Field of the Invention

This invention relates to a material for converting an invisible ultraviolet ray into a visually observable visible ray with a high efficiency, and it is concerned with an oxide fluorescent glass capable of exhibiting visible fluorescence, which is useful for controlling an optical axis of a laser beam such as excimer laser and can be applied to fluorescent tubes for lamps, fluorescent fibers, backlights or display devices of LCD.

2. Description of the Prior Art

Phosphors using rare earth elements have widely been used up to the present time, mainly, as phosphors for lamps, color picture tubes, etc. Of late, materials for the anti-Stokes-wise wavelength conversion of infrared light into visible light have extensively been studied, for example, as to application to laser materials.

Tb ion showing a green fluorescence has been put to practical use as color picture tubes, high color rendering fluorescent lamps, etc. Eu ion showing a fluorescence with a narrow spctrum width in the red region has been put to practice as color picture tubes, high color rendering fluorescent lamps, etc. As described above, a phosphor using Tb or Eu has already been put to practical use, but such a phosphor is an opaque material which is obtained by coating a suitable carrier with a powdered phosphor to thus give only a superficial emission.

As such a glass utilizing fluorescence of Tb or Eu, there are used those described in Japanese Patent Publication Nos. 27047/1982 and 27048/1982 and Japanese Patent Laid-Open Publication No. 133780/1996.

However, the glasses described in these publications, for example, in Japanese Patent Publication No. 27047/1982 contain only at most 1.5 mol % of $Eu_2O_3$ as a fluorescent agent. In the case of Japanese Patent Publication No. 27048/1982, only at most 1.5 mol % of $Tb_2O_3$ is contained as a fluorescent agent. In such a degree of concentration of $Eu_2O_3$ or $Tb_2O_3$, no sufficient fluorescent intensity can be obtained. In the case of Japanese Patent laid-Open Publication No. 133780/1996, a large amount of a fluorescent agent is contained, but a fluorophosphate is used and thus, production of a glass for a fluorescent lamp or large-sized glass plate is difficult due to small thermal durability and small glass strength thereof.

SUMMARY OF THE INVENTION

It is an object of the present invention to provide a Tb- or Eu-containing oxide fluorescent glass whereby the above described problems of the prior art can be solved.

It is another object of the present invention to provide a Tb- or Eu-containing oxide fluorescent glass in which a large quantity of Tb or Eu can be incorporated, concentration quenching is hard to occur and a strong fluorescence is exhibited in the visible region by irradiation of ultraviolet rays such as excimer laser, and which has excellent thermal durability as well as large glass strength.

These objects can be attained by an oxide fluorescent glass capable of exhibiting fluorescence in the visible region by excitation with ultraviolet rays, having a chemical composition comprising, at least, silicon (Si), boron (B) and oxygen (O), and further containing terbium (Tb) or europium (Eu) as a fluorescent agent.

BRIEF DESCRIPTION OF THE DRAWINGS

The accompanying drawings illustrate the principle and merits of the present invention.

DETAILED DESCRIPTION OF THE INVENTION

Figure 1:
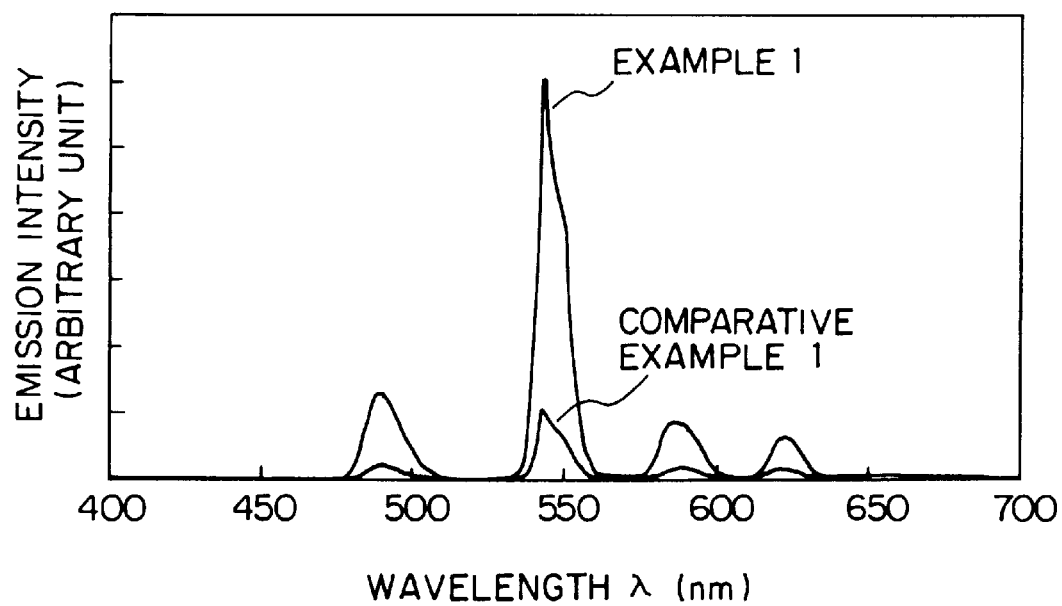
FIG. 1 is a graph showing a fluorescent spectrum of the glass prepared in Example 1 with Comparative Example 1, excited by an ultraviolet ray of 365 nm.

Generally, the fluorescence of rare earth ions tends to be subject to concentration quenching and the basic absorption of a glass matrix at the short wavelength side is shifted to the long wavelength side with the increase of amounts of rare earth elements. Accordingly, capture of an excited energy takes place by the non-emission center, so that a fluorescent material presenting a strong fluorescence cannot be obtained. This problem can first be solved by the present invention. Furthermore, thermal durability or glass strength can be improved by the use of an oxide glass according to the present invention.

That is, according to the present invention, there is provided (1) an oxide fluorescent glass capable of exhibiting fluorescence in the visible region by excitation with ultraviolet rays, having a chemical composition comprising, at least, silicon (Si), boron (B) and oxygen (O), and further containing terbium (Tb) or europium (Eu) as a fluorescent agent.

Specifically, the present invention relates to (2) an oxide fluorescent glass capable of exhibiting visible flurescence, as described in the above (1), which is represented, in term of atoms for making up the glass, by the following chemical composition (mol %):

| | |
|---|---|
| $SiO_2$ | 2 to 60%, |
| $B_2O_3$ | 5 to 70% ($SiO_2 + B_2O_3$ = 50 to 70%) |
| RO | 5 to 30% (R: at least one atom selected from Mg, Ca, Sr and Ba) |
| ZnO | 0 to 15% |
| $ZrO_2$ | 0 to 10%, |
| $Tb_2O_3$ or $Eu_2O_3$ | 2 to 15% (containing either of $Tb_2O_3$ or $Eu_2O_3$) |
| $Ln_2O_3$ | 0 to 20% (Ln: at least one atom selected from Y, La, Gd, Yb, Lu, Sm, Dy and Tm) |
| $CeO_2$ | 0 to 1% |
| $Bi_2O_3$ | 0 to 2% |
| $Sb_2O_3$ | 0.01 to 0.5% and |
| $R'_2O$ | 0 to 20% (R': at least one atom selected from Li, Na and K) |

The reasons for limiting the composition range of each component of this oxide fluorescent glass to described above are as follows:

$SiO_2$ is a glass-forming component, which is present in a proportion of 2 to 60%, since if less than the lower limit, the viscosity of the glass melt is too lowered to form the glass, while if more than the upper limit, the melting temperature is too increased to prepare the glass. The preferred range is 5 to 50%.

$B_2O_3$ is a glass-forming component, which is present in a proportion of 5 to 70%, since if less than the lower limit, it is difficult to form the glass, while if more than the upper limit, the durability is deteriorated. The preferred range is 10 to 60%.

The sum of $SiO_2+B_2O_3$ should be 50 to 70%, preferably 50 to 65%.

RO (R: at least one atom selected from Mg, Ca, Sr and Ba), Zn and Zr are components for improving the melting property of the glass, which are present in proportions of RO 5 to 30%, ZnO 0 to 15% and $ZrO_2$ 0 to 10%, since if more than the upper limit, the glass is unstable and tends to be crystallized, while if less than the lower limit, the glass is hard to be melted. The preferred ranges are RO 15 to 25%, ZnO 0 to 10% and $ZrO_2$ 0 to 4%. Large amounts of $Tb_2O_3$ or $Eu_2O_3$ can be stably incorporated in the glass by incorporating RO (alkaline earth metal oxides) as an essential component.

$R'_2O$ (R': at least one atom selected from Li, Na and K) acts to lower the melting temperature of a glass melt, which is present in a proportion of 0 to 20%, since if exceeding the above described range, the water resisting property is lowered and the devitrification tendency is increased, thus rendering the glass unstable. The preferred range is 0 to 15%.

$Tb_2O_3$ is an important component capable of presenting green fluorescence by ultraviolet excitation. This component should be present in a proportion of 2 to 15%, since if more than the upper limit, the glass is hard to be obtained. The preferred range is 2.1 to 11.3%.

$Eu_2O_3$ is an important component capable of presenting red fluorescence by ultraviolet excitation. This component should be present in a proportion of 2 to 15%, since if more than the upper limit, the glass is hard to be obtained. The preferred range is 2.3 to 11.7%.

$Ln_2O_3$ (Ln: at least one atom selected from Y, La, Gd, Yb, Lu, Sm, Dy and Tm) is a component for increasing the viscosity of the glass and suppressing crystallization. This component should be present in a proportion of 0 to 20%, since if more than the above described range, the above described effect is deteriorated. The preferred range is 0 to 10%.

$CeO_2$ is a component acting as a sensitizer of Tb, which is present in a proportion of 0 to 1%, but if exceeding the above described upper limit, this effect is decreased. In addition, this is also a component for exhibiting blue fluorescence when not containing Tb. The preferred range is 0 to 0.2%.

$Bi_2O_3$ is a component acting as a sensitizer of Eu, which is present in a proportion of 0 to 2%, but if exceeding the above described upper limit, the percent transmission of ultraviolet rays is lowered and this effect is decreased. The preferred range is 0 to 1%.

$Sb_2O_3$ is a component acting as a cleaning agent, which is present in a proportion of 0.01 to 0.5%, but if exceeding the above described upper limit, the percent transmission of ultraviolet rays is lowered, while if less than the lower limit, this effect is decreased. The preferred range is 0.02 to 0.2%.

Production of the oxide fluorescent glass capable of exhibiting visible fluorescence, according to the present invention is carried out by mixing the corresponding raw material compounds to a proportion of the object composition, for example, silica, boric anhydride, zinc oxide, calcium carbonate, terbium oxide, europium oxide, etc., melting the resulting mixture in the air at a temperature of 1200 to 1500° C. for 2 to 3 hours and allowing the mixture to flow out in a metallic mold, followed by shaping.

Preferred embodiments of the present invention are described below:

(I) An oxide fluorescent glass capable of exhibiting visible fluorescence, as described in the foregoing (1), which is represented, in term of atoms for making up the glass, by a chemical composition (mol %) shown in Table 1:

TABLE 1

| $SiO_2$ | 5 to 50% |
|---|---|
| $B_2O_3$ | 10 to 60% |
| $SiO_2 + B_2O_3$ | 50 to 70% |
| RO ① | 15 to 25% |
| ZnO | 0 to 10% |
| $ZrO_2$ | 0 to 4% |
| $R'_2O$ ② | 0 to 15% |
| $Tb_2O_3$ ④ | 2.1 to 11.3% |
| $Eu_2O_3$ ④ | 2.3 to 11.7% |
| $Ln_2O_3$ ③ | 0 to 10% |
| $CeO_2$ | 0 to 0.2% |
| $Bi_2O_3$ | 0 to 1% |
| $Sb_2O_3$ | 0.02 to 0.2% |

(Note)
① R: at least one atom selected from Mg, Ca, Sr and Ba
② R': at least one atom selected from Li, Na and K
③ Ln: at least one atom selected from Y, La, Gd, Yb, Lu, Sm, Dy and Tm)
④ either of $Tb_2O_3$ or $Eu_2O_3$ The present invention will now be illustrated in detail without limiting the same:

EXAMPLE 1

Raw materials were mixed according to weight ratios of Example No. 1 shown in Table 2 to give a composition of Example No. 1 shown in Table 3. In this case, CaO and BaO were given from the corresponding carbonates or nitrates. The thus prepared raw materials were melted at a temperature of 1200 to 1500° C. for 2 to 3 hours, allowed to flow in a metallic mold and shaped to obtain a glass in stable manner.

When the resulting glass was excited by an ultraviolet ray of 365 nm, green fluorescence was exhibited to give a fluorescent spectrum shown in FIG. 1.

EXAMPLES 2 TO 5

Raw materials were mixed according to weight ratios of Example Nos. shown in Table 2 and melted in the similar manner to Example 1 to obtain glass compositions shown in Table 3 in stable manner.

When the resulting glasses in Examples 2 to 5 were excited by an ultraviolet ray of 365 nm, similar spectra to Example 1 were obtained exhibiting green fluorescence.

EXAMPLE 6

Raw materials were mixed according to weight ratios of Example No. 6 shown in Table 2 to give a composition of Example No. 6 shown in Table 3. In this case, BaO and $Na_2O$ were given from the corresponding carbonates or nitrates. The thus prepared raw materials were melted at a temperature of 1200 to 1500° C. for 2 to 3 hours, allowed to flow in a metallic mold and shaped to obtain a glass in stable manner.

Figure 2:
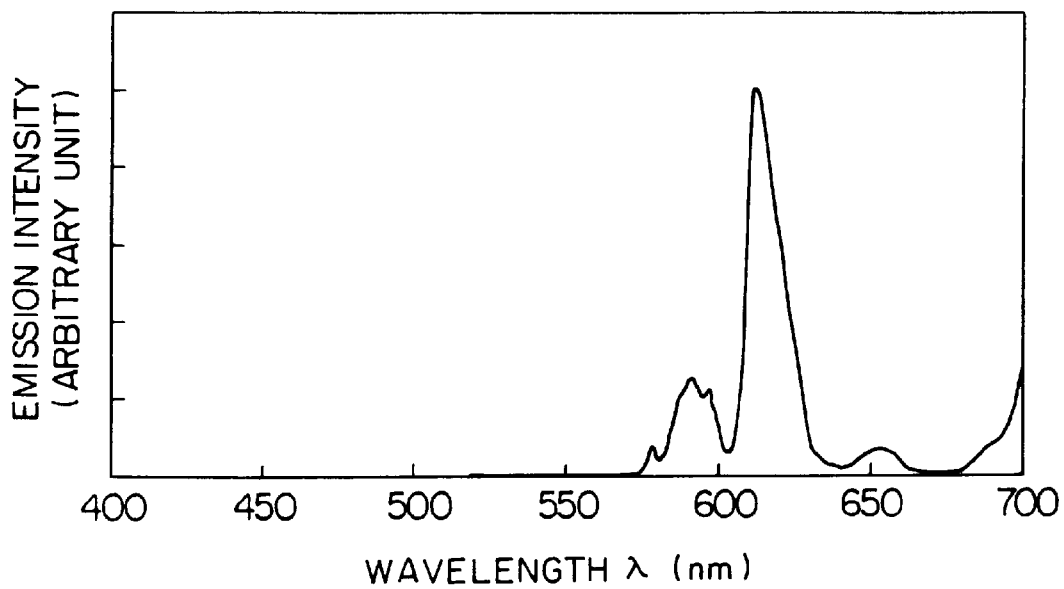
FIG. 2 is a graph showing a fluorescent spectrum of the glass prepared in Example 6, excited by an ultraviolet ray of 365 nm.

When the resulting glass was excited by an ultraviolet ray of 365 nm, red fluorescence was exhibited to give a fluorescent spectrum shown in FIG. 2.

EXAMPLES 7 TO 10

Raw materials were mixed according to weight ratios of Example Nos. shown in Table 2 and melted in the similar manner to Example 6 to obtain glass compositions shown in Table 3 in stable manner.

When the resulting glasses in Examples 7 to 10 were excited by an ultraviolet ray of 365 nm, similar spectra to Example 6 were obtained exhibiting red fluorescence.

TABLE 2

(g)

| Example No. | 1 | 2 | 3 | 4 | 5 | 6 | 7 | 8 | 9 | 10 |
|---|---|---|---|---|---|---|---|---|---|---|
| $SiO_2$ | 6.0 | 3.0 | 8.4 | 10.4 | 32.0 | 32.0 | 32.0 | 23.0 | 10.4 | 6.0 |
| $B_2O_3$ | 37.0 | 40.0 | 35.2 | 33.2 | 8.0 | 8.0 | 8.0 | 31.0 | 33.2 | 37.0 |
| CaO | 10.0 | 10.0 | 12.6 | 12.6 | | | | 14.3 | 12.6 | 10.0 |
| BaO | | | | | 32.0 | 32.0 | 32.0 | | | |
| ZnO | 5.0 | 5.0 | 3.8 | 2.0 | 8.0 | 8.0 | 8.0 | | 2.0 | 5.0 |
| $ZrO_2$ | | | | | 5.0 | | 5.0 | | | |
| $Na_2O$ | | | | | 5.0 | 5.0 | 5.0 | 7.9 | | |
| $Tb_2O_3$ | 15.0 | 15.0 | 15.0 | 41.8 | 8.5 | | | | | |
| $Eu_2O_3$ | | | | | | 13.0 | 10.0 | 17.9 | 41.8 | 8.0 |
| $La_2O_3$ | 27.0 | 27.0 | 20.0 | | | | | | | 20.0 |
| $Gd_2O_3$ | | | 5.0 | | 1.5 | | | | | 14.0 |
| $CeO_2$ | 0.1 | 0.1 | 0.1 | | 0.1 | | | | | |
| $Bi_2O_3$ | | | | | | 2.0 | | 5.9 | | |
| $Sb_2O_3$ | 0.1 | 0.05 | 0.05 | 0.2 | 0.1 | 0.2 | 0.1 | 0.2 | 0.2 | 0.2 |

TABLE 3

(mol %)

| Example No. | 1 | 2 | 3 | 4 | 5 | 6 | 7 | 8 | 9 | 10 |
|---|---|---|---|---|---|---|---|---|---|---|
| $SiO_2$ | 10.0 | 5.1 | 13.5 | 17.1 | 48.2 | 49.5 | 48.2 | 30.0 | 17.0 | 10.0 |
| $B_2O_3$ | 53.4 | 58.1 | 48.9 | 47.0 | 10.4 | 10.7 | 10.4 | 35.0 | 46.8 | 53.4 |
| CaO | 17.9 | 18.0 | 21.7 | 22.2 | | | | 20.0 | 22.1 | 17.9 |
| BaO | | | | | 18.9 | 19.4 | 18.9 | | | |
| ZnO | 6.2 | 6.2 | 4.5 | 2.4 | 8.9 | 9.1 | 8.9 | | 2.4 | 6.2 |
| $ZrO_2$ | | | | | 3.7 | | 3.7 | | | |
| $Na_2O$ | | | | | 7.3 | 7.5 | 7.3 | 10.0 | | |
| $Tb_2O_3$ | 4.1 | 4.2 | 4.0 | 11.3 | 2.1 | | | | | |
| $Eu_2O_3$ | | | | | | 3.4 | 2.6 | 4.0 | 11.7 | 2.3 |
| $La_2O_3$ | 8.3 | 8.4 | 5.9 | | | | | | | 6.2 |
| $Gd_2O_3$ | | | 1.3 | | 0.4 | | | | | 3.9 |
| $CeO_2$ | 0.06 | 0.06 | 0.06 | | 0.05 | | | | | |
| $Bi_2O_3$ | | | | | | 0.4 | | 1.0 | | |
| $Sb_2O_3$ | 0.03 | 0.02 | 0.02 | 0.07 | 0.03 | 0.06 | 0.03 | 0.05 | 0.07 | 0.07 |

COMPARATIVE EXAMPLE 1

Raw materials were mixed in a weight ratio calculated from a glass composition known in the art, i.e. 75% of $B_2O_3$, 17% of $Na_2O$, 2% of $Al_2O_3$, 3.45% of CaO, 1% of $La_2O_3$, 0.05% of $Eu_2O_3$ and 1.5% of $Tb_2O_3$ (by mol %), melted at a temperature of 1000 to 2000° C. for 2 to 3 hours, allowed to flow in a metallic mold and shaped to obtain a glass in stable manner. In this case, the amount of Eu or Tb is less than in Examples of the present invention.

When the resulting glass was excited by an ultraviolet ray of 365 nm and a fluorescent spectrum was measured, a similar spectrum to Example 1 was obtained exhibiting green fluorescence. However, the emission intensity was given as the highest peak at 542 nm, corresponding to ⅓ times of that of Example 1, as shown in FIG. 1.

Advantages of the Invention

The oxide fluorescent glass of the present invention is capable of converting an invisible ultraviolet ray into a visually observable visible ray with a high efficiency and available for controlling an optical axis of a laser beam such as excimer laser. In addition, the fluorescent glass of the present invention can be applied to fluorescent tubes for lamps, fluorescent fibers, backlights or display devices of LCD, so it is expected that industrial applications of the present invention will be enlarged.

What is claimed is:

1. An oxide fluorescent glass capable of exhibiting visible fluorescence, which is represented by the following chemical composition consisting essentially of:

| | |
|---|---|
| $SiO_2$ | 5 to 50 mol %, |
| $B_2O_3$ | 10 to 60 mol %, ($SiO_2 + B_2O_3$ = 50 to 65 mol %) |
| RO | 15 to 25 mol % (R: at least one element selected from Mg, Ca, Sr and Ba) |
| ZnO | 0 to 10 mol % |
| $ZrO_2$ | 0 to 4 mol %, |
| $Tb_2O_3$ or $Eu_2O_3$ | 2.1 to 11.3 mol % |
| $Ln_2O_2$ | 0 to 10 mol % (Ln: at least one element selected from Y, La, Gd, Yb, Lu, Sm, Dy and Tm) |
| $CeO_2$ | 0 to 0.2 mol % |
| $Bi_2O_3$ | 0 to 1 mol % |
| $Sb_2O_3$ | 0.02 to 0.2 mol % and |
| $R'_2O$ | 0 to 15 mol % (R': at least one element selected from Li, Na and K). |

* * * * *